March 1, 1927.
R. W. EVANS
1,619,501
SCREEN FOR AUTOMOBILES
Filed Oct. 10, 1925
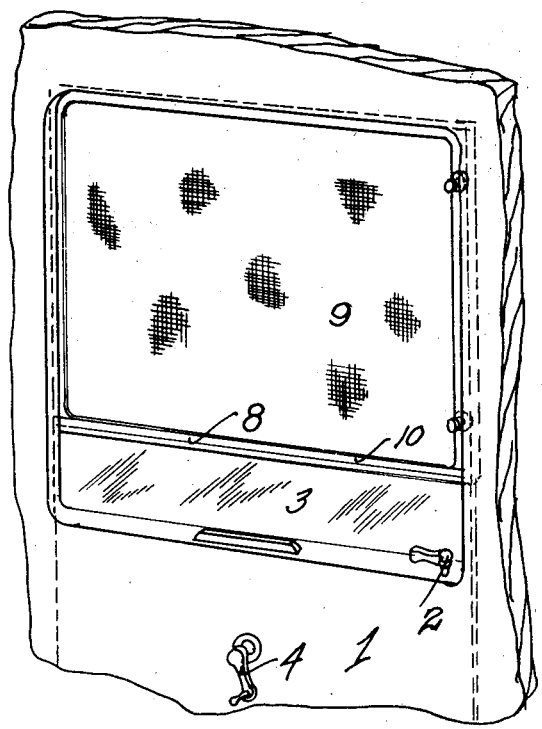
Fig.1
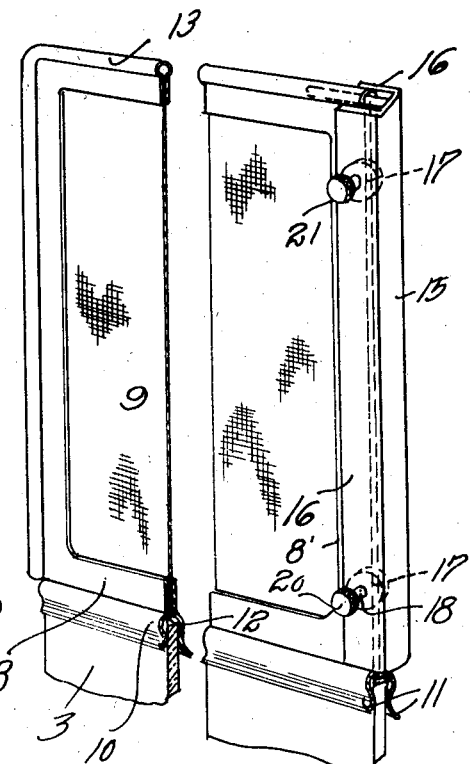
Fig.2
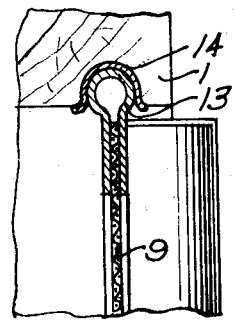
Fig.3
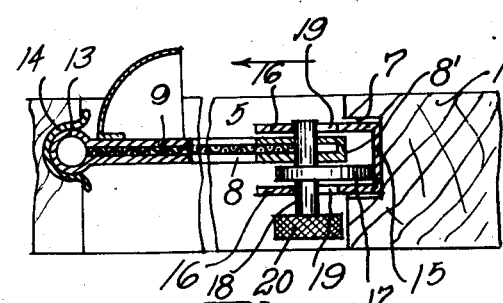
Fig.4
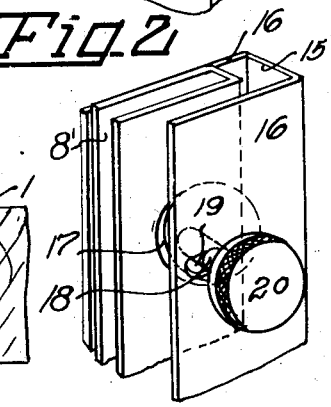
Fig.5
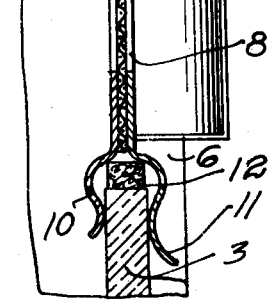
Inventor
Richard W. Evans
By Herbert E. Smith
Attorney Patented Mar. 1, 1927.

1,619,501

UNITED STATES PATENT OFFICE.

RICHARD WALTER EVANS, OF SPOKANE, WASHINGTON.

SCREEN FOR AUTOMOBILES.

Application filed October 10, 1925. Serial No. 61,720.

My present invention relates to improvements in screens for automobiles especially adapted for use in connection with the ventilating openings of vehicles of the closed-car type. The screens are detachable and adapted for use in the openings of the car doors as well as in the openings of the side windows of the body of the car.

The primary object of the invention is the provision of means for permitting the necessary ventilation of the interior of the closed car or automotive vehicle, and at the same time eliminate or break up the undesirable drafts or air currents that are caused to pass through the interior of the closed car while the latter is in motion. I accomplish these purposes by providing a detachable window screen having means for attachment to the window frame of the closed car and adapted to be used in the window opening when the usual glass panel has been lowered out of operative position. Means are provided whereby the screen may with facility be secured to the several parts of the permanent window structure and the glass panel and the screen retained in rigid position to eliminate any rattling sound. By the utilization of my invention the screen may readily be attached for use and with equal facility be detached from the window, as when it is necessary to raise the glass panel in case of rain.

The invention consists in certain novel combinations and arrangements of parts as will hereinafter be more fully set forth. In the accompanying drawings I have illustrated one complete example of the physical embodiment of my invention in connection with a window of a closed car, wherein the parts are combined and arranged according to one mode I have so far devised for the practical application of the principles of my invention.

Figure 1 is a view from the interior of a closed car showing a portion of a door and the screen of my invention applied to the window-opening in the door.

Figure 2 is an enlarged, detail perspective view partly broken away, showing the relation of the screen to the glass panel of the door, the panel being in lowered position.

Figure 3 is a vertical sectional view through the screen showing it in place and secured at its lower end to the glass panel of the door.

Figure 4 is an enlarged sectional detail view in a horizontal plane showing the extension rail of the screen in place.

Figure 5 is a detail perspective view showing a portion of the extension rail and one of the locks therefor.

While I have illustrated in the drawings the screen as applied especially to the window opening in one of the side doors of the closed car it will be understood that the screens are also applicable for use with all doors and also with the windows in the sides of the car, where the glass panel, as is customary, may be lowered in a pocket in the door or in the side of the car body.

In order that the general arrangement and assembly of parts may readily be understood I have depicted in Figure 1 a door 1 of suitable type having a lock lever or catch 2, the glass panel 3 and a crank handle 4, the latter adapted to be turned to raise or lower the glass panel with relation to the opening 5 in the door. The screen of my invention is designed for use when the glass panel is lowered as in Figure 1 which shows an interior or inside view of the door, with the glass panel lowered. The glass panel as usual is guided by the side walls 6 of the window frame which are grooved as at 7 for this purpose.

The screens in suitable number are adapted each for use with a window opening and are preferably of rectangular shape made up of a metal frame 8 which is clamped or secured in other suitable manner over the edges of the screen portion 9.

At the lower or bottom end of the screen I utilize an inverted U-shaped bar 10 rigid with or integral with the rectangular frame, and fashioned with resilient jaws 11 that are adapted to slip over and frictionally engage the outer and inner sides of the top edge of the glass panel 3 as best seen in Figure 3. A pad or cushion 12 is interposed in the cross bar and within the frame to frictionally engage and rest on the top edge of the glass panel for eliminating vibrations and rattling of the frame on the glass.

The top cross bar and one side bar of the rectangular frame are fashioned with rigid tubular beads 13, the latter to fit into one of the vertical grooves 7 of the window frame and the top bead is designed to slip up into an inverted U-shaped, grooved plate 14 fixed in the top wall of the window frame as seen in Figure 3.

At one side of the screen frame I utilize an extension rail for co-action with the window-frame groove 7. This extension rail which is designated 15 having side flanges 16, 16, is designed for use with the side bar 8' of the screen frame, and its flanges overlap this frame bar as indicated in Figures 4 and 5. The extension rail is disposed in vertical position and is laterally adjustable with relation to the screen frame for insertion into and withdrawal from the grooved wall of the window frame. For this purpose two cam disks 17 are utilized and are rigidly secured to pins 18 that are journaled in the side rail 8' of the window screen-frame. A pair of oppositely arranged horizontal slots 19 are fashioned in the flanges 16 to permit the required movement of the pins, and so that the cams 17 may press against the channel rail 15 knurled heads or knobs 20 and 21 rigid with the respective pins are employed for turning the cam disks.

It will be apparent that the top bead and side bead of the screen frame are entered in their respective channel members of the window frame, with the lower U-shaped cross bar frictionally engaging the top edge of the glass panel. The frame is thus located with the extension, side-rail 15 in retracted position to reduce the width of the screen as a whole. With the screen in this position the two knurled knobs or handles 20 and 21 are turned by hand causing their respective cams or cam disks 17 to laterally extend the extension rail into the groove 7 of the window frame. In this position the screen is rigidly secured against vibration or rattling and provides an effective means for breaking up the direct entrance of air currents or drafts through the window opening. When not required the screens may quickly be displaced by first turning the disks to unlocked position to free the extension rail. The released rail is then in position to permit the frame bar 8' of the screen to be pushed into a rail to permit withdrawal of the screen frame from its normal position, and the screen may then be bodily removed from the window opening.

Having thus fully described my invention, what I claim as new and desire to secure by Letters Patent is—

1. The combination with a grooved window frame and lower glass panel, of a screen having a resilient bottom bar for engagement with said glass panel, a side extension rail carried by the screen, and means for projecting said rail in the grooved window frame.

2. The combination with a grooved window frame and a lower glass panel, of a detachable screen having an inverted U-shaped resilient bottom bar and cushion for engagement with said panel, a side extension rail carried by the screen, and means for projecting said rail to locked position in the grooved window frame.

3. The combination with a grooved window frame, of a screen and a U-shaped extension rail having a pair of spaced slots therein, a pair of pins journaled, in the screen and located in said slots, cams on the pins for engagement with said rail, and heads on said pins for rotating the cams.

4. The combination with a rectangular screen frame having an upper beaded bar and a side beaded bar, of a bottom bar having opposed clasping jaws, a side extension bar of U shape, a pair of spaced pins in the screen frame and located in complementary slots in the extension bar, cam disks on said pins for projecting said extension bar, and heads on said pins for rotating the cams.

In testimony whereof I affix my signature.

RICHARD WALTER EVANS.